(12) United States Patent
Bohacik

(10) Patent No.: US 6,840,975 B2
(45) Date of Patent: Jan. 11, 2005

(54) GREASE FILTER

(75) Inventor: Richard Bohacik, Forked River, NJ (US)

(73) Assignee: Component Hardware Group, Inc., Lakewood, NJ (US)

( * ) Notice: Subject to any disclaimer, the term of this patent is extended or adjusted under 35 U.S.C. 154(b) by 74 days.

(21) Appl. No.: 10/389,537

(22) Filed: Mar. 14, 2003

(65) Prior Publication Data

US 2004/0177598 A1 Sep. 16, 2004

(51) Int. Cl.[7] .............................................. B01D 45/08
(52) U.S. Cl. ...................... 55/442; 29/896.62; 55/443; 55/464; 55/DIG. 5; 55/DIG. 36; 126/299 D
(58) Field of Search ......................... 55/440, 442–444, 55/464, DIG. 36, DIG. 5; 126/299 D; 29/896.62

(56) References Cited

U.S. PATENT DOCUMENTS

| | | | | |
|---|---|---|---|---|
| 3,125,869 A | * | 3/1964 | Winton | 62/317 |
| 3,566,585 A | * | 3/1971 | Voloshen et al. | 55/435 |
| 3,870,494 A | * | 3/1975 | Doane | 55/443 |
| 3,952,640 A | * | 4/1976 | Kuechler | 126/299 D |
| 4,085,736 A | * | 4/1978 | Kuechler | 126/299 D |
| 4,350,504 A | * | 9/1982 | Diachuk | 422/105 |
| 4,557,740 A | * | 12/1985 | Smith | 55/440 |
| 5,302,174 A | * | 4/1994 | Guetersloh | 55/444 |
| 5,429,116 A | * | 7/1995 | Brown | 126/299 D |
| 6,083,302 A | * | 7/2000 | Bauver, II et al. | 95/216 |
| 6,454,825 B1 | * | 9/2002 | Cheimets et al. | 55/DIG. 36 |

* cited by examiner

Primary Examiner—Richard L. Chiesa
(74) Attorney, Agent, or Firm—Francis C. Hand; Carella, Byrne, Bain etal.

(57) ABSTRACT

The grease filter is made with components that are secured together about the periphery of the filter by a seam with smooth surfaces. In one embodiment, the filter is constructed of three components, namely, a pair of plates and a rectangular or square frame. The peripheral edges of the plates and frame are interfolded on each other to form a rolled seam. The resulting structure is rigid and does not twist.

28 Claims, 4 Drawing Sheets

GREASE FILTER

This invention relates to a grease filter. More particularly, this invention relates to a grease filter for commercial kitchens.

As is known, commercial kitchens such as in fast food establishments employ a series of stoves for cooking food. Typically, the stoves have overhead fans for drawing off heated air, vapors and grease. In order to trap the grease being drawn off, filters have been placed between the fans and the stove in order to catch the grease and to redirect the grease to a suitable outlet.

In the past, grease filters have been constructed of many pieces that are mechanically assembled. However, this requires time-consuming operations to fabricate the filters.

The louvers on opposite sides of the grease filter have also been staggered relative to each other to create a flame barrier. That is, the openings of the louvers are staggered relative to each other so that a flame can not pass directly through the openings of the louvers from one side of the filter to the other side.

In other cases, grease filters for commercial kitchens have been constructed of two pieces that fit one within the other to define a flat box-like structure. In addition, each filter piece has been provided with passageways, usually defined by louvers that are bent into the box-like structure, in a front wall and a back wall. Typically, the grease filters are mounted so that an upward flow of air and vapor passes into the passages of the front wall of the filters before being deflected within the grease filters to pass out through the passages in the back wall. During travel through the grease filter, the grease within the airflow is deposited onto the louvers as well as onto any internal structure within the grease filter. The grease eventually trickles under gravity to a lower most point within the filter and passes through suitable openings in the filter to a take-off means. However, these grease filters have sharp edges and corners that may eventually cause injury to a user.

It has also been known that grease filters require removal and cleaning at regular intervals in industrial cleaning equipment in order to eliminate accumulated grease and other matter therein. However, after repeated cleanings and handling, various parts of the filter may come loose allowing the filter to be easily twisted. Also, loose parts may fall away. In the event that a louver on one side of the filter has been lost, users have simply turned the filter over when being put back in place, thereby defeating the flame barrier requirement of the filter. Further, a visual inspection of such a defective filter would not reveal that the hidden side of the filter is missing an important part.

Accordingly, it is an object of the invention to provide a grease filter that will not twist.

It is another object of the invention to eliminate sharp edges on a grease filter.

It is an object of this invention to provide a grease filter of economic construction.

It is another object of the invention to provide a grease filter which is of robust construction.

It is another object of the invention to provide a grease filter that can be fabricated in a relatively simple economical manner.

Briefly, the invention provides a grease filter which is comprised of three components. In particular, the grease filter has a front plate having a plurality of spaced apart parallel passages, a back plate having a plurality of spaced apart parallel passages and a rectangular frame secured to and between the peripheries of the front and back plates.

Each plate is initially of rectangular or square shape with four radiused corners. In addition, each plate has an outwardly directed peripheral flange, a lip extending angularly from the flange, and a peripherally extending recess adjacent the peripheral flange. Also, each plate has a plurality of pairs of louvers therein with each pair of louvers defining a respective one of a plurality of spaced apart parallel passages in the plate.

The rectangular frame is initially formed from a strip of metal that is shaped into a rectangle with radiused corners adapted to the size and shape of the plates and the radiused corners of the plates. In addition, the frame has a pair of flanges that extend outwardly. Each of these flanges is interfolded with the respective lip and flange of a respective one of the plates to form a seam that secures the plates and frame together to form a rigid box-like structure suitable for use as a grease filter.

The invention also provides a method of forming a grease filter that is relatively simple and that requires relatively little labor. This method comprises the initial steps of obtaining a pair of plates, each of which has an outwardly directed peripheral flange, a lip extending angularly from the flange, and a plurality of spaced apart parallel passages and obtaining a rectangular frame having a pair of flanges extending outwardly thereof.

Next, the frame is placed between the pair of plates with each flange of the frame opposite the flange of a plate. Thereafter, each flange of the frame is interfolded with the lip and flange of a respective plate to form a seam to secure the frame to the plates. Preferably, the seam is a rolled can style seam wherein the lip and flange of a plate and the flange of the frame together with the bodies of the plate and frame form a five-layer seam.

Alternatively, the filter may be fabricated with the flanges of the frame and the flanges of the plates being interfolded to form a three layer seam that is then staked at spaced apart locations.

The construction of the grease filter is such that the rolled seams between the rectangular frame and each of the plates imparts a rigid construction to the grease filter. In this respect, the grease filter conforms with ULC-S649-93 Standard for Greease Filters For Commercial and Institutional Kitchen Exhaust Systems, amended 1997, paragraph 3.4

The grease filter is constructed so that the passages in the front plate and back plate are staggered relative to each other. In addition, each plate is provided with pairs of inwardly directed louvers to define a respective passage. Each louver may also be corrugated or otherwise shaped in order to rigidify the louver or to impart turbulence to an airflow passing over the louver.

A frame which is used to make the grease filter is typically formed of a single strip of material, such as a steel strip, having a pair of ends disposed in secured relation.

While the grease filter may be made of any suitable shape, a rectangular or square shape is the conventional shape for the grease filter.

These and other objects and advantages of the invention will become more apparent from the following detailed description taken in conjunction with the drawings wherein.

Figure 1A:
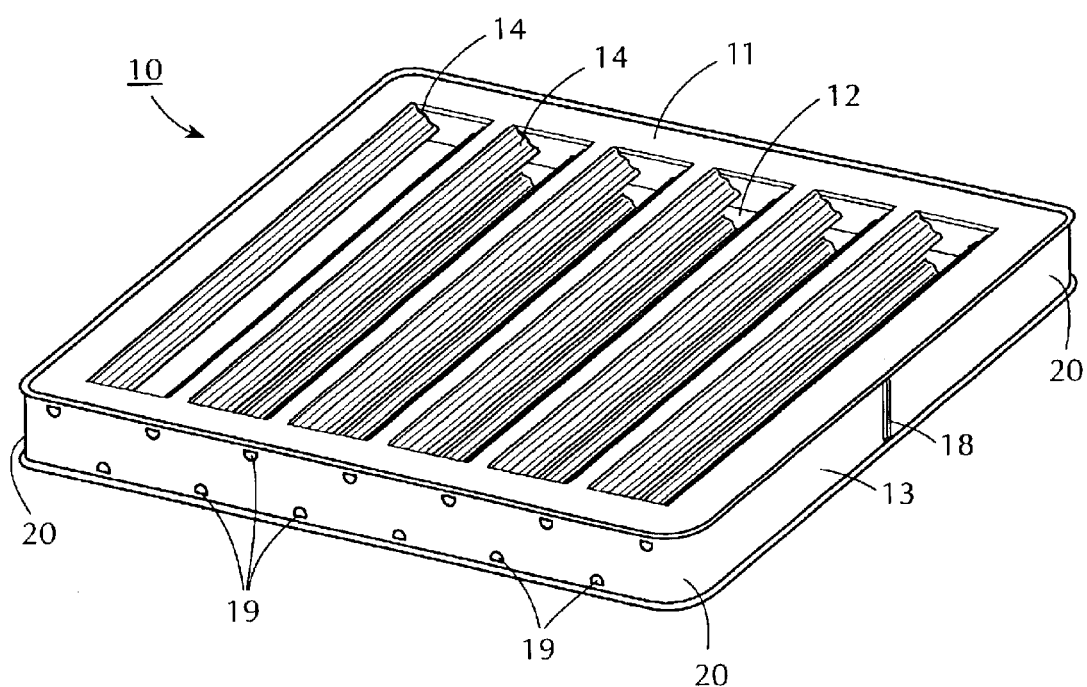
FIG. 1A illustrates a perspective view of a grease filter constructed in accordance with the invention.

Referring to FIG. 1A, the grease filter 10 is comprised of three components namely, a front plate 11, a back plate 12 and a rectangular frame 13.

The front plate 11 is made from a flat blank of a suitable material, such as stainless steel, that is stamped or otherwise worked into the illustrated shape, i.e. a rectangular shape with radiused corners. The plate 11 is also provided with a plurality of pairs of inwardly directed louvers 14 so that each pair of louvers 14 defines a passage.

Figure 2:
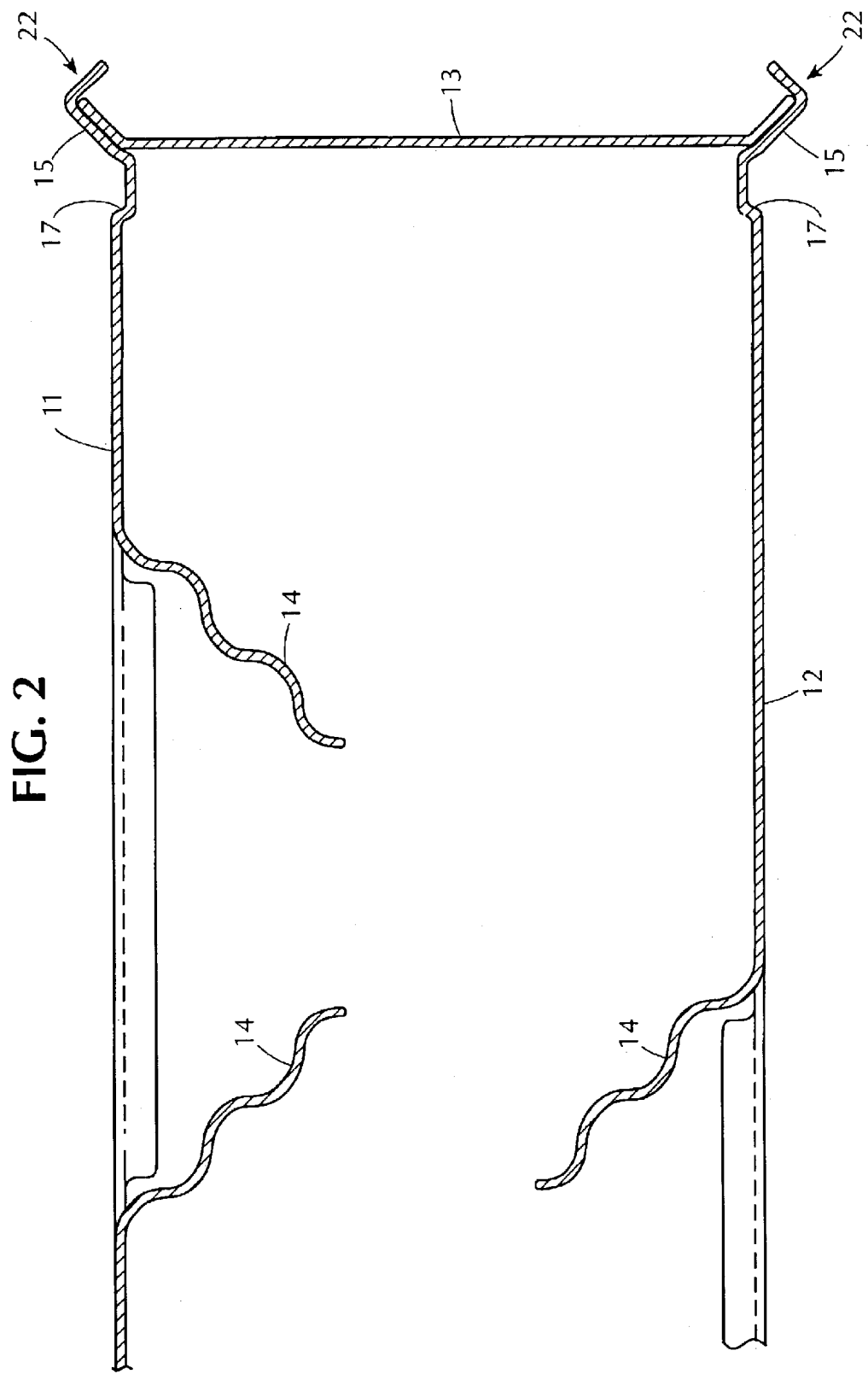
FIG. 2 illustrates a part cross-sectional view of the components for forming the grease filter of FIG. 1 during an initial step of fabrication in accordance with the invention.

As illustrated in FIG. 2, the plate 11 has an outwardly directed flange at the periphery that is angularly disposed, e.g. at an angle of 45° to the plane of the plate 11. Each flange 15 also has a lip 16 extending, e.g. at a 90° angle from the edge of the flange 15 towards the plane of the plate 11. Also, a recess 17 extends peripherally of the plate 11 adjacent the flange 15

The back plate 12 is constructed in a similar manner as the front plate except that the pairs of louvers 14 are staggered relative to the pairs of louvers 14 in the front plate 11. In this way, the passages in the back plate 12 are in staggered relation to the passages in the front plate 11.

Figure 1B:
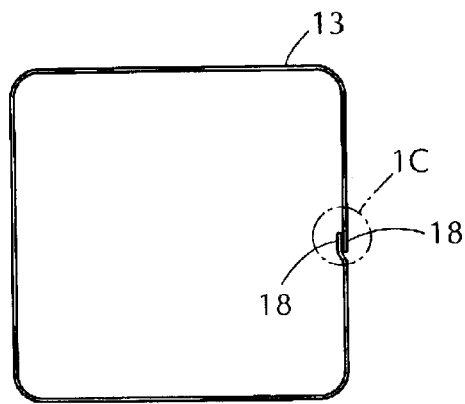
FIG. 1B illustrates a cross-sectional view of the rectangular frame used to make the grease filter of FIG. 1A.

The rectangular frame 13 is disposed between and peripherally of the front plate 11 and back plate 12. Typically, the rectangular frame 13 is made from one or more strips of material, such as stainless steel. In the illustrated embodiment, a single strip is used with the ends 18 thereof disposed in overlapping welded relation as indicated in FIG. 1B. In addition, at least one section of the rectangular frame 13 that is to define the bottom of the grease filter 10 is provided with a plurality of staggered openings 19 to allow grease and debris within the grease filter 10 to fall under gravity out of the bottom of the filter 1 when in use.

As shown in FIG. 1A, the rectangular frame 13 is formed with radiused corners 20 adapted to the size and shape of the plates 11, 12. As shown in FIG. 2, the frame 13 is flat with a pair of flanges 21 extending angularly outwardly thereof, for example, at an angle of 45°.

Figure 1C:
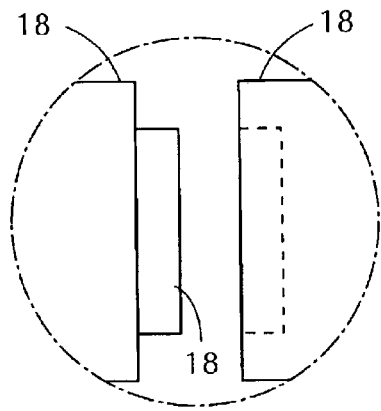
FIG. 1C illustrates an enlarged view of the ends of the strip used to make the rectangular frame of FIG. 1A.

Referring to FIG. 1C, the ends 18 of the strip forming the rectangular frame 13 are fabricated so that one end 18 has a reduced portion 18' that forms an off set bend that lays over the opposite end 18 of the strip and is welded to the underside thereof. This allows the peripheral flanges 21 of the two ends 18 of the frame 13 to be abutted against each other to form a smooth continuous surface while also eliminating multiple layers of material in a subsequently formed seam. However, any other suitable mechanical fastening technique may be employed to achieve securement of the ends together.

Figure 3A:
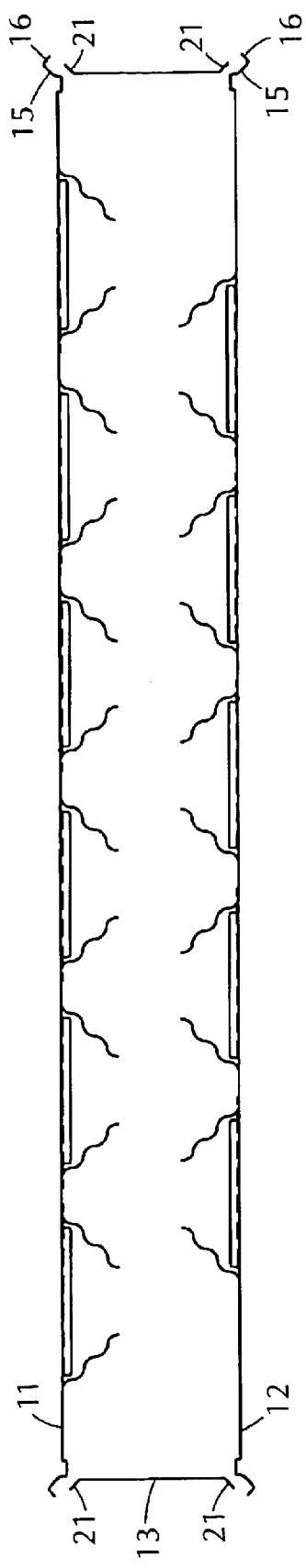
FIG. 3A illustrates an exploded view of the components of the grease filter of FIG. 1.
Figure 4:
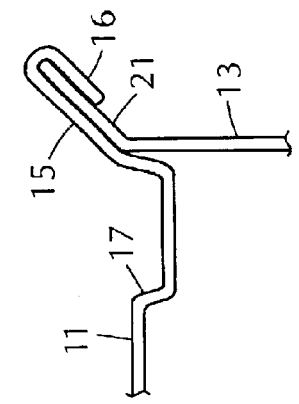
FIG. 4 illustrates an initial step in the process of fabricating a rolled seam in the grease filter in accordance with the invention.
Figure 5:
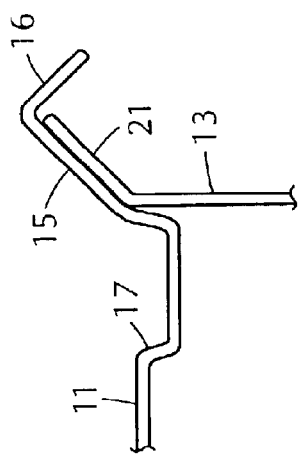
FIG. 5 illustrates a second step in the process of manufacturing a rolled seam in accordance with the invention.
Figure 6:
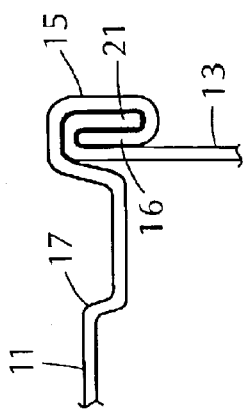
FIG. 6 illustrates a third step in the process of forming a rolled seam in accordance with the invention.
Figure 7:
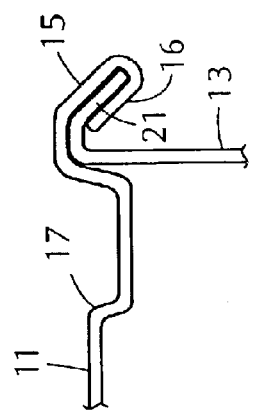
FIG. 7 illustrates a fourth step in the process of fabricating a rolled seam in accordance with the invention.
Figure 8:
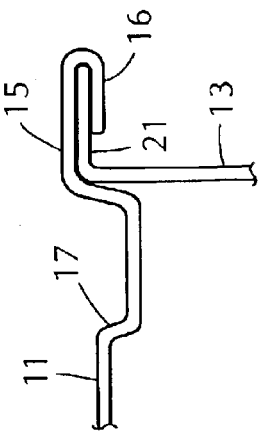
FIG. 8 illustrates a final step in the fabrication of a rolled seam in accordance with the invention.

Referring to FIG. 3A, in order to fabricate the grease filter 10, the plates 11, 12 and frame 13 are placed in a suitable holder (not shown) so that the flanges 21 of the rectangular frame 13 abut the outstanding flanges 15 of the respective plates 11, 12, for example as illustrated in FIG. 4. Thereafter, the fixture (not shown) is actuated so that the peripheral lip 16 of each of the plates 11, 12 is folded over the flange 21 of the rectangular frame 13 as indicated in FIG. 5. As this forming process continues, the now-joined peripheral edges of the frame and respective plates are further folded as indicated in FIGS. 6 and 7 into a rolled can-style seam 22 as indicated in FIG. 8. This seam 22 is characterized in being formed of five layers, i.e. the flange 15, the flange 21, the lip 16, the frame 13 and the plate 11(12).

It is to be noted that fixtures and machines for forming a rolled can-style seam are well known and the process need not be further described.

Figure 3B:
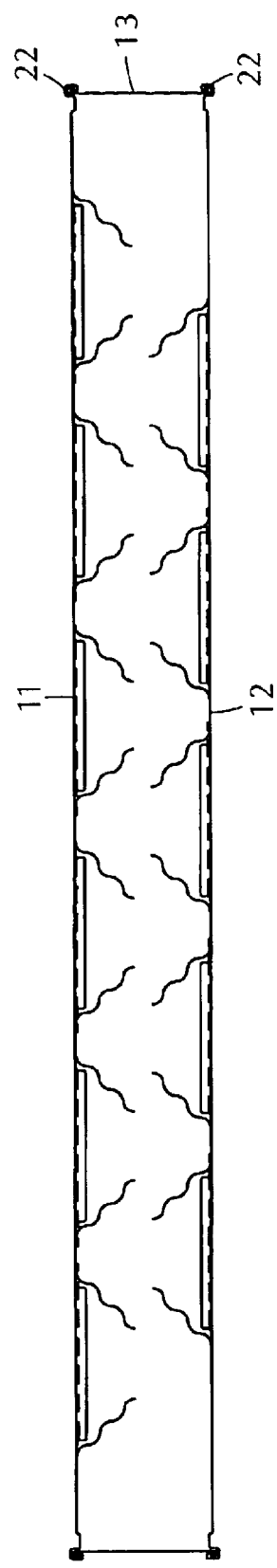
FIG. 3B illustrates a cross-sectional view of the grease filter of FIG. 1.

Referring to FIG. 3B, upon completion of the fabrication steps, the plates 11, 12 are firmly connected to the rectangular frame 13 to form a rigid grease filter. In this respect, a grease filter constructed as above may have overall dimensions of 20 inches by 20 inches with the plates 11, 12 and rectangular frame 13 being made of 0.030 gauge aluminum.

The thickness of the plates 11, 12 and rectangular frame 13 may be of any suitable gauge, such as 0.020 gauge and 0.030 gauge. Further, the plates 11, 12 and frame 13 may be made of any suitable material, such as aluminum, galvanized steel and stainless steel.

Referring to FIG. 1A, each of the louvers 14 may be corrugated, as is known, in order to provide turbulence of flow of air therethrough.

The grease filter 10 may alternatively be made of two piece construction, namely, a drawn bottom (not shown) and a plate as described above. In this embodiment, the drawn bottom replaces the frame and lower plate of the first embodiment and is secured to the upper plate with a rolled seam as above.

The frame 13 may alternatively be secured to the plate 11 via a three layer seam. In this case, a flange (not shown) of the frame 13 is folded over a flange of the plate 11 to form the three layer seam and then a plurality of spaced apart stakes are made in the folded over flanges using a suitable staking tool (not shown). Alternatively, the folded over flanges may be mechanically secured, e.g. as by riveting.

In use, the grease filter 10 would be mounted over a stove in a commercial kitchen so that heated air and vapor may be drawn upwardly by an overhead fan though the passages in the front plate 11 and, after being redirected, drawn upwardly through the passages in the back plate 12 for exhausting in the usual manner. During this time, grease and other particulate matter within the air flow would be caught by the louvers 14 of the front plate 11 and of the back plate 12 as well as the internal walls of the filter 10. Eventually, the grease would move under gravity to the bottom of the filter 10 and pass outwardly through the openings 19 in the bottom sidewall of the frame 13. Similar openings may also be provided in the top sidewall of the rectangular frame 13 so that the filter may be mounted without regard to which end of the filter is the top or the bottom.

The invention thus provides a grease filter that has a structural integrity necessary for rough field handling, cleaning and maintenance.

Further, the invention provides a grease filter that is void of sharp edges about the entire periphery and that is easily fabricated.

What is claimed is:

1. In a grease filter, the combination comprising a plate having a plurality of pairs of spaced apart inwardly directed louvers defining a plurality of parallel passages for a flow of air and vapor therethrough; and a frame disposed peripherally of said plate, said frame having an upper peripheral edge interfolded with a peripheral edge of said plate to define a seam thereat.

2. The combination as set forth in claim 1 wherein said frame has a plurality of apertures in at least one side thereof for passage of accumulated grease therethrough.

3. The combination as set forth in claim 1 wherein said plate is of rectangular shape.

4. The combination as set forth in claim 1 wherein each of said plate and said frame has a radiused corner.

5. The combination as set forth in claim 1 wherein said frame has a plurality of pairs of spaced apart inwardly directed louvers defining a plurality of parallel passages for a flow of air and vapor therethrough.

6. The combination as set forth in claim 5 wherein said passages in said frame are staggered relative to said passages in said plate.

7. A grease filter comprising
a front plate having a plurality of spaced apart parallel passages therein;
a back plate having a plurality of spaced apart parallel passages therein;
a rectangular frame disposed between and peripherally of said front plate and said back plate, said frame having an upper peripheral edge interfolded with a peripheral edge of said front plate to define a seam thereat and a lower peripheral edge interfolded with a peripheral edge of said back plate to define a seam thereat.

8. A grease filter as set forth in claim 7 wherein said passages in said front plate are staggered relative to said passages in said back plate.

9. A grease filter as set forth in claim 7 wherein said front plate has a plurality of pairs of inwardly directed louvers, each said pair of louvers defining a respective passage therebetween.

10. A grease filter as set forth in claim 7 wherein said frame is formed of a single strip of material having a pair of ends disposed in overlapping welded relation.

11. A grease filter as set forth in claim 7 wherein each of said front plate, back plate and frame is made of a material selected from the group consisting of aluminum, galvanized steel and stainless steel.

12. A grease filter as set forth in claim 7 wherein said frame has a plurality of apertures in at least one side thereof.

13. A grease filter as set forth in claim 7 wherein each said seam is characterized in having five layers of material of said respective plate and said frame defining a cross-section thereof.

14. A grease filter as set forth in claim 7 wherein said peripheral edge of said front plate is folded over said upper peripheral edge of said frame and said upper peripheral edge of said frame is folded on itself.

15. A grease filter as set forth in claim 14 wherein said peripheral edge of said back plate is folded over said lower peripheral edge of said frame and said lower peripheral edge of said frame is folded on itself.

16. A grease filter as set forth in claim 7 wherein each of said front plate and said back plate has a radiused corner.

17. The combination comprising
a first plate having an outwardly directed peripheral flange, a lip extending angularly from said flange, and a plurality of spaced apart parallel passages therein;
a second plate having an outwardly directed peripheral flange, a lip extending angularly from said flange, and a plurality of spaced apart parallel passages therein; and
a rectangular frame having a pair of flanges extending outwardly thereof whereby said flange of each said plate may be interfolded with a respective flange of said frame to form a seam to secure said respective plate to said frame to form a grease filter.

18. The combination as set forth in claim 17 wherein said first plate has a plurality of pairs of louvers therein, each said pair of louvers defining a respective one of said passages therein.

19. The combination as set forth in claim 18 wherein each said louver is corrugated.

20. The combination as set forth in claim 17 wherein said frame has a plurality of apertures in at least one side thereof.

21. A grease filter comprising
a first plate having a peripheral flange, a lip extending from said flange, and a plurality of spaced apart parallel passages therein;
a second plate having a peripheral flange, a lip from said flange, and a plurality of spaced apart parallel passages therein; and
a rectangular frame secured to and between said first plate and said second plate, said frame having a pair of flanges, each said flange of said frame being interfolded with said flange of a respective one of said first plate and said second plate to form a seam to secure said frame to each respective plate.

22. A grease filter as set forth in claim 21 wherein each said plate is of rectangular shape with radiused corners and includes a recess extending peripherally thereof adjacent said peripheral flange thereof.

23. A grease filter as set forth in claim 21 wherein each said seam is a rolled can style seam.

24. A grease filter as set forth in claim 21 wherein each of said first plate and said second plate has a plurality of pairs of louvers therein, each said pair of louvers defining a passage therebetween for a flow of air and vapor.

25. The combination as set forth in claim 24 wherein each said louver is corrugated.

26. The combination as set forth in claim 21 wherein said frame has a plurality of apertures in at least one side thereof.

27. In a method of forming a grease filter, the steps of
obtaining a plate having an outwardly directed peripheral flange, a lip extending angularly from said flange, and a plurality of spaced apart parallel passages therein;
obtaining a rectangular frame having a pair of flanges extending outwardly thereof;
placing said frame adjacent said plate with said flange of said frame opposite said flange of said plate; and
thereafter interfolding said flange of said frame with a respective lip and flange of said plate to form a seam to secure said frame to said plate.

28. A method of forming a grease filter comprising the steps of
obtaining a pair of plates, each said plate having an outwardly directed peripheral flange, a lip extending angularly from said flange, and a plurality of spaced apart parallel passages therein;
obtaining a rectangular frame having a pair of flanges extending outwardly thereof;
placing said frame between said pair of plates with each said flange of said frame opposite said flange of a respective plate; and
thereafter interfolding each said flange of said frame with a respective lip and flange of a respective plate to form a seam to secure said frame to said plates.

* * * * *